US012695803B2

(12) United States Patent 
Ballew et al.

(10) Patent No.: US 12,695,803 B2 
(45) Date of Patent: *Jul. 28, 2026

(54) DYNAMIC STORAGE AND FORWARDING OF DATA

(71) Applicant: CenturyLink Intellectual Property LLC, Denver, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/886,415

(22) Filed: Sep. 16, 2024

(65) Prior Publication Data

US 2025/0016228 A1     Jan. 9, 2025

Related U.S. Application Data

(63) Continuation of application No. 18/338,665, filed on Jun. 21, 2023, now Pat. No. 12,095,861.

(60) Provisional application No. 63/368,842, filed on Jul. 19, 2022.

(51) Int. Cl.
| | |
|---|---|
| *H04L 12/24* | (2006.01) |
| *G06Q 10/06* | (2023.01) |
| *G06Q 50/50* | (2024.01) |
| *H04L 41/0803* | (2022.01) |
| *H04L 67/1097* | (2022.01) |
| *H04W 4/06* | (2009.01) |
| *H04L 69/28* | (2022.01) |

(52) U.S. Cl.
CPC ......... *H04L 67/1097* (2013.01); *G06Q 10/06* (2013.01); *G06Q 50/50* (2024.01); *H04W 4/06* (2013.01); *G06Q 2220/00* (2013.01); *H04L 69/28* (2013.01)

(58) Field of Classification Search
CPC . H04L 67/1097; H04L 63/0428; H04L 69/28; H04L 69/407; G06Q 10/06; G06Q 50/50; G06Q 2220/00; H04W 4/06
USPC ........................................................ 709/219
See application file for complete search history.

(56) References Cited

U.S. PATENT DOCUMENTS

| | | | | |
|---|---|---|---|---|
| 11,604,699 | B2 * | 3/2023 | Behera ................ | G06F 11/1438 |
| 12,045,491 | B2 | 7/2024 | Subramanian | |
| 2008/0094247 | A1 | 4/2008 | Milne | |
| 2008/0215883 | A1 * | 9/2008 | Fok ....................... | H04W 12/06 |
| | | | | 713/167 |
| 2011/0055161 | A1 * | 3/2011 | Wolfe ................. | G06F 11/2094 |
| | | | | 707/E17.014 |
| 2013/0326379 | A1 * | 12/2013 | Arrasvuori ............. | H04W 4/80 |
| | | | | 715/764 |

(Continued)

*Primary Examiner* — Ario Etienne 
*Assistant Examiner* — Elizabeth Kassa

(57) ABSTRACT

Systems and methods for dynamic storage and forwarding of data are described. When remote storage is unreachable by a device via a wide area network (WAN), the device may negotiate for temporary storage on another device connected to the same local area network (LAN). The temporary storage may have a specified storage amount and a specified storage time. The specified storage amount and/or specified storage time may be renegotiated if more space or time is desired. Temporary storage on multiple devices connected to the LAN may be available. The data in temporary storage may be transferred between different LAN devices.

8 Claims, 4 Drawing Sheets

(56)                    References Cited

U.S. PATENT DOCUMENTS

| | | | |
|---|---|---|---|
| 2016/0100325 A1* | 4/2016 | Hain | H04W 24/10 |
| | | | 370/241 |
| 2017/0199817 A1* | 7/2017 | Ishihara | G06F 12/0868 |
| 2019/0235979 A1 | 8/2019 | Li | |
| 2019/0238636 A1 | 8/2019 | Li | |
| 2019/0243676 A1 | 8/2019 | Wang | |
| 2019/0268764 A1* | 8/2019 | Wei | H04L 9/3234 |
| 2020/0210372 A1* | 7/2020 | Wu | G06F 16/162 |
| 2020/0379946 A1 | 12/2020 | Coffman | |
| 2021/0019063 A1* | 1/2021 | Lee | G06F 11/1484 |
| 2021/0141694 A1* | 5/2021 | Cope | G06F 11/2094 |
| 2024/0031436 A1 | 1/2024 | Ballew | |

* cited by examiner

100

DYNAMIC STORAGE AND FORWARDING OF DATA

BACKGROUND

A local device may store data on remote storage, such as storage located on the Internet or other wide-area network (WAN). If the local device is unable to connect to the remote storage, such as if a network outage occurs or a router crashes, the local device may not be able to store some or all of its collected data. Failure to store data collected by the local device may result in data loss or cause the local device to crash or fail.

It is with respect to these and other general considerations that the aspects disclosed herein have been made. Also, although relatively specific problems may be discussed herein, it should be understood that the examples should not be limited to solving the specific problems identified in the background or elsewhere in this disclosure.

SUMMARY

Examples of the present disclosure describe systems and methods for dynamic storage and forwarding of data across multiple devices. In an aspect, a method is disclosed. The method includes generating, by a first device, first data to be stored at remote storage via a wide area network (WAN). Additionally, the method includes determining that the remote storage is unreachable from the first device. The method further includes determining, in response to determining that the remote storage is unreachable from the first device, whether temporary storage is available on a second device via a local area network (LAN). Further, the method includes sending, by the first device, second data to the second device via the LAN. The method also includes determining that the remote storage is reachable from the first device via the WAN; and causing, based on determining that the remote storage is reachable from the first device via the WAN, the second data to be sent to the remote storage.

In an example, determining whether temporary storage is available on the second device comprises: sending, by the first device, a request for temporary storage; and receiving, by the first device, a response from the second device indicating that the second device is available for temporary storage. In another example, the request for temporary storage comprises a broadcast advertisement that is sent to the second device and at least a third device via the LAN, and wherein the response from the second device comprises an amount of the second data that the second device is capable of storing for the first device and a duration that the second device will temporarily store the second data. In a further example, the method includes encrypting, by the first device, the second data prior to sending the second data to the second device, wherein the second data is a portion of the first data. In yet another example, the method includes sending, by the first device, a storage key to the second device with the second data. In still a further example, causing the second data to be sent to the remote storage comprises: sending a request for the second data from the first device to the second device, the request for the second data comprising the storage key; receiving, by the first device, the second data from the second device; and sending the second data from the first device to the remote storage.

In another example, causing the second data to be sent to the remote storage comprises: sending a request to the second device to send the second data from the second device to the remote storage. In a further example, the method includes receiving, by the first device, an indication from the second device of when the second data will expire at the second device; and prior to expiration of the second data at the second device, requesting, by the first device, that the second data be transferred by the second device. In yet another example, the method includes determining that a third device connected to the first device via the LAN has capacity to store the second data; wherein requesting that the second data be transferred by the second device comprises requesting, by the first device, that the second device transfers the second data to the third device. In still a further example, determining whether temporary storage is available on a second device via the LAN is also based on determining that storage capacity of the first device exceeds a threshold.

In another aspect a method is disclosed. The method includes determining that a first internal storage of a first device has reached a threshold capacity. Additionally, the method includes broadcasting, by the first device, a request for temporary storage on a second device via a local area network (LAN). The method also includes sending, by the first device, data to the second device via the LAN. Further, the method includes determining, by the first device, that a remote storage is reachable from the first device via a wide area network (WAN). Additionally, the method includes causing, based on determining that the remote storage is reachable from the first device via the WAN, the data to be sent to the remote storage.

In an example, the method includes determining that, when the first internal storage of the first device has reached the threshold capacity, the remote storage is unreachable from the first device. In another example, the method includes receiving, from the second device via the LAN, a response to the request, the response including storage terms specifying a storage space and a storage time. In a further example, the method includes determining, by the second device, that an elapsed time is within a time threshold of the storage time; and sending, by the second device via the LAN, a notification to the first device of an impending expiration of the storage time. In yet another example, the method includes determining, by the first device, that an elapsed time is within a time threshold of the storage time; and requesting, by the first device via the LAN, an extension of the storage time at the second device. In still a further example, the method includes receiving, at the first device via the LAN, a confirmation of the extension of the storage time. In another example, causing the data to be sent to the remote storage comprises: sending, by the first device via the LAN, a request for the second device to return the data; receiving, by the first device via the LAN, the data from the second device; and sending, by the first device via the WAN, the data to the remote storage.

In a further aspect, a system is disclosed. The system includes at least one processor; and memory, operatively connected to the at least one processor and storing instructions that, when executed by the at least one processor, cause the system to perform a method. The method includes detecting, by a first device, that a remote storage is unreachable via a wide area network (WAN). Additionally, the method includes broadcasting, by the first device via a local area network (LAN), a first request for first temporary storage. The method also includes accepting, by the first device, first storage terms for the first temporary storage at a second device, the first storage terms including a first specified storage time. Further, the method includes sending, by the first device, data to the second device. The method also includes determining, by the first device, that an elapsed time is nearing the first specified storage time. The method includes requesting, by the first device, an extension of the first specified storage time at the second device. Additionally, the method includes receiving, at the first device, a denial of the extension from the second device. The method further includes broadcasting, by the first device via the LAN, a second request for second temporary storage. In addition, the method includes accepting, by the first device, second storage terms at a third device, the second storage terms including a second specified storage time. The method also includes causing a transfer of the data from the second device to the third device.

In an example, the method includes determining, by the first device, that the remote storage is reachable from the first device via the WAN; receiving, based on determining that the remote storage is reachable from the first device via the WAN, the data to be sent to the first device from the third device; and sending the data to the remote storage from the first device. In another example, the data is encrypted by the first device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

A local device may store data on remote storage, such as storage located on the Internet or other wide-area network (WAN). Upload of data to remote storage (e.g., a central server or cloud storage) may allow future access and/or analysis of the data, such as for statistical analysis, monitoring, troubleshooting, data scrubbing, data storage, etc. If remote storage is unreachable from a local device, such as if a network outage occurs or a router or modem crashes, the local device may temporarily store the data in local storage. Local storage of a local device, however, often has limited storage capacity, which may not be large enough store some or all of the data collected when the remote storage is unreachable. Thus, local devices using and/or relying on remote storage may experience problems (e.g., loss of data, crashing, etc.) when unable to connect to remote storage.

Solutions to a local device being unable to connect to remote storage may include dynamic storage and forwarding of data to a different local device. When remote storage is unreachable by a device via a WAN, the device may negotiate for temporary storage on another device connected to the same local area network (LAN). The temporary storage may have a specified storage amount and a specified storage time. The specified storage amount and/or time may be renegotiated if more space or time is desired. Temporary storage on multiple devices connected to the LAN may be available. The data in temporary storage may be transferred between different LAN devices.

Figure 1:
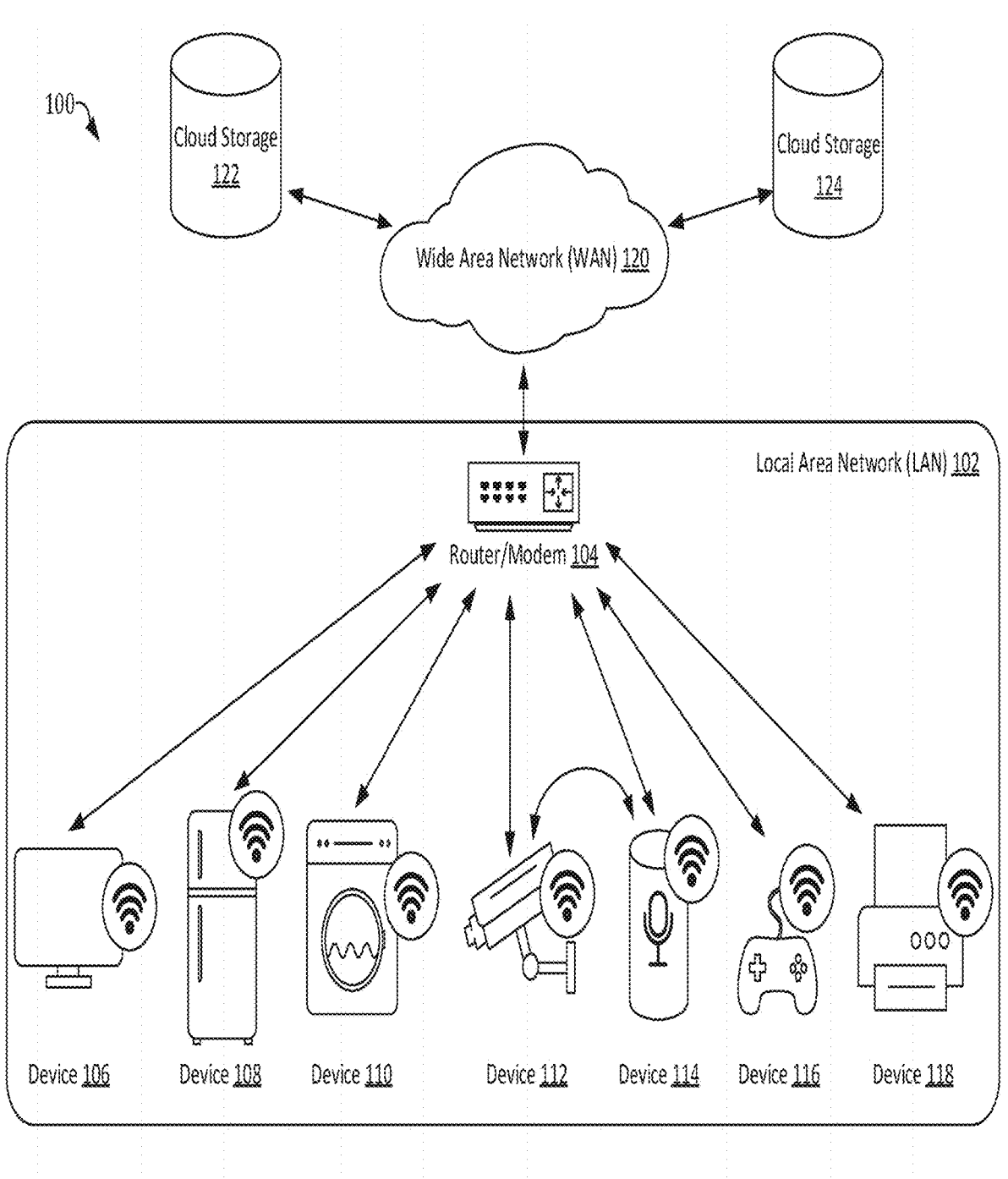
FIG. 1 depicts an example system for dynamic storage and forwarding of data.

FIG. 1 depicts an example system 100 for dynamic storage and forwarding of data. The system 100 includes a local area network 102 (LAN 102) with a router/modem 104 and a collection of devices 106-118. The system 100 also includes a wide area network 120 (WAN 120) over which the devices 106-118 may communicate with cloud storage 122, 124 (e.g., via the router/modem 104).

The devices 106-118 on the LAN 102 may each have unique characteristics. For example, each of the devices 106-118 may be a different type or have a different function. For instance, a first device 106 may be a television, a second device 108 may be a smart refrigerator, a third device 110 may be a smart washing machine, a fourth device 112 may be a camera, a fifth device 114 may be a smart speaker, a sixth device 116 may be a gaming console, and a seventh device 118 may be a printer. The LAN 102 may also include a combination router/modem 104. In other examples, the router and modem functions can be provided by separate devices. Although specific examples of devices are provided, any device with wireless communication capabilities on a LAN 102 are appreciated. Characteristics of the devices 106-118 may include primary function, total storage capacity, allocable temporary storage capacity, and/or capacity threshold(s) for storage capacity. Total storage capacity is the total data storage capacity of a device. Allocable temporary storage capacity is a portion of the total storage capacity of the device that may be allocated to a purpose other than the primary function of the device for a specified period of time.

In a specific example, a first device 106 may have a primary function as a television with a total storage capacity of 10 GB. The first device 106 may have 2 GB of allocable temporary storage capacity out of the 10 GB of total storage capacity. The 2 GB of allocable temporary storage capacity may be for a specified period of time, such as 2 hours, 5 hours, 10 hours, 12 hours, 24 hours, etc. Additionally, the 2 GB of allocable temporary storage capacity may be used to store data not associated with the primary function of the first device 106 (e.g., data not relating to television, applications for the television, etc.). For example, the allocable temporary storage capacity may be used to store encrypted data sent from another device (e.g., devices 108-118), as otherwise described herein. In some examples, the allocable temporary storage capacity may be dynamically and periodically determined by the first device 106.

The devices 106-118 may be capable of communicating with each other via the LAN 102. The devices 106-118 may communicate with each other through a router 104 or may directly communicate with each other (e.g., as shown in FIG. 1 between the fourth device 112 and the fifth device 114). Although direct communication is depicted between two of the devices shown in FIG. 1, direct communication between any of the devices 106-118 is appreciated. In this example, the router may assign local IP addresses for the LAN 102 and route data from the devices 106-118 on the LAN 102 via the WAN 120 to one or more of cloud storage 122, 124. Communication between devices 106-118 via the LAN 102 may be associated with allocable temporary storage capacity of a device. For example, a device may advertise a request for temporary storage on a different device. For instance, a third device 110 may advertise a request for temporary storage on any other device on the LAN 102 (e.g., devices 106, 108, 112, 114, 116, 118). In another example, a device may advertise that allocable temporary storage is available on that device. For instance, a sixth device 116 may advertise to other devices on the LAN 102 that allocable temporary storage is available on the sixth device 116. In examples, devices 106, 108, 110, 112, 114, 116, 118 may dynamically calculate their respective allocable temporary storage capacity periodically and/or in response to receiving a request for temporary storage.

The broadcasted advertisement (e.g., a request for temporary storage or a broadcast of available temporary storage) may be based on a detected triggering event. An advertisement may be broadcasted to LAN 102 devices 106-118 via a specified port, a multi-port address that is shared among the LAN 102 devices, a multi domain name server (DNS), a Digital Living Network Alliance (DNLA) protocol, etc. A triggering event for a requesting device (e.g., a device requesting temporary storage on another device on the LAN 102) may be when the requesting device cannot communicate with at least one cloud storage 122, 124 (e.g., when cloud storage 122, 124 associated with remotely storing data for a requesting device is unreachable, such as during Internet outage, cloud outage, router crash, etc.). Alternatively, a triggering event for a requesting device may be loss of Internet access (e.g., loss of connection to the WAN 120). As another alternative, a triggering event of the requesting device may be reaching at least a threshold percentage or threshold amount of total storage usage (e.g., 80%, 90%, 95%, etc. of total storage capacity used) or having less than a threshold percentage or threshold amount of total storage capacity remaining on the requesting device (e.g., 20%, 10%, 5% of total storage capacity remaining). Combinations of such factors may also be defined as triggering events. A triggering event for an assisting device (e.g., a device advertising availability of allocable temporary storage capacity) may be loss of Internet access (e.g., loss of connection to the WAN 120). In lieu of a triggering event, assisting devices may periodically broadcast temporary storage availability to all other devices on the LAN 102.

The advertisement request or proposal may be accepted or negotiated. Additionally, as described herein, the allocable temporary storage of the assisting device may be associated with a specified storage time and a specified storage space. For example, an assisting device may specify, during advertisement and/or negotiation of temporary storage, a specified storage space and a specified storage time for its allocable temporary storage. In an example where the requesting device is advertising a request for temporary storage, an assisting device may respond with a proposal for negotiation. For instance, a requesting device may advertise a request temporary storage from another device via the LAN 102. An assisting device may respond to the advertisement with a specified storage time and a specified storage space associated with its allocable temporary storage. The requesting device may then accept or decline the response from the assisting device. In some situations, the requesting device may accept multiple responses from multiple assisting devices (e.g., if no one assisting device has enough specified storage space) and send data to multiple assisting devices for temporary storage. Alternatively, in an example where the assisting device is advertising allocable storage space, a requesting device may accept, decline, or not respond to the advertisement. If no response is received by the assisting device after a certain period of time, the assisting device may cease broadcasting the advertisement (e.g., treat the lack of response like a declination). The assisting device may wait to receive at least a preset amount of declinations and/or at least a period of time before ceasing the broadcast of the advertisement.

After the triggering event is no longer active or detectable (e.g., reconnection to the Internet, re-established communication between the requesting device and cloud storage, increased remaining total storage capacity on the requesting device, etc.), data may be returned to the requesting device for upload to cloud storage 122, 124. In an example where the triggering event is loss of Internet connection, the temporarily transferred data may be returned to the requesting device when Internet connection is re-established. The requesting device may instruct the assisting device to send the data back. Alternatively, the assisting device may send the data back automatically upon detection of termination of the triggering event. The data may be returned in pieces to prevent, or reduce the chances of, overwhelming the total storage capacity of the requesting device. For example, a first portion of the data may be returned to the requesting device, which the requesting device uploads to the cloud storage 122, 124 prior to receiving a second portion of the data, etc. The flow of streaming of the returning data may be controlled by the requesting device. For example, as the data is being returned, an acknowledgement of retrieval can be delayed to cause delay in delivery of the next packet (e.g., the assisting device may not delete or send a next packet until acknowledgement of retrieval is received from the requesting device for the prior packet).

In some examples, the assisting device may upload the transferred data to the cloud storage 122, 124 on behalf of the requesting device, instead of returning the data to the requesting device to upload. In this instance, the requesting device and/or assisting device may identify itself with the cloud storage 122, 124 and/or establish a trusted relationship with the cloud storage 122, 124 prior to data transfer.

When the specified storage time elapses, or after the data is returned to the requesting device, the assisting device may delete the temporarily stored data and/or reallocate the temporary storage. If, prior to the return of data to the requesting device, an elapsed storage time is nearing or approaching a specified storage time of the temporary storage, the requesting device may renew or renegotiate temporary storage of the data by the assisting device. Stated alternatively, an extension of time may be requested by the requesting device to avoid expiration of the temporary storage and data loss at, or deletion by, the assisting device. The elapsed storage time may be determined to be nearing or approaching the specified storage time at a threshold percentage (e.g., 70%, 80%, 90%, 95%, 99%, etc.) or with a minimum time remainder (e.g., 5 minutes, 10 minutes, 30 minutes, 1 hour, 2 hours, 4 hours, etc.). For instance, a first device 106 transferred data to a sixth device 116 with the following temporary storage terms: 2 GB of data (e.g., the specified storage space) for 12 hours (e.g., the specified storage time). At an elapsed time of 11 hours (e.g., a minimum time remainder of 1 hour), the requesting device may request a time extension for the transferred data to continue to be stored by the assisting device. Alternatively, the requesting device may request additional time and storage space at the assisting device. As another alternative, the assisting device may decline an extension or renegotiation and/or propose a counteroffer to a negotiation (e.g., specifying a new specified storage time and/or specified storage space).

If the assisting device is unable or unwilling to store some or all of the transferred data at the end of the specified storage time, the requesting device may ask another device on the LAN 102 to temporarily store the data (e.g., re-advertise a request for temporary storage). The requesting device may facilitate or instruct a transfer of some or all of the data to a different assisting device on the LAN 102. For example, the requesting device may instruct the original assisting device to send the data to the subsequent assisting device, rather than returning the data to the requesting device to re-transfer.

The devices 106-118 may be capable of encrypting data, decrypting data, hashing data, creating an identifier for data, or any other data modification associated with securing transferable data. A requesting device may encrypt data and then send the encrypted data to an assisting device via a variety of protocols, such as an HTTP PUT command. The requesting device may also send an identifying storage key for the encrypted data that may be used to later request return of the data. The identifying storage key may be a hash (e.g., 32-bit, 64-bit, etc.), a Window ID, or any other identifier that is preferably not guessable. For example, if data is sent from a first device 106 to a second device 108 for temporary storage, the first device 106 may encrypt the data prior to sending the data to the second device 108. The data may then be securely transferred from the first device 106 to the second device 108 via the LAN 102. The second device 108 may not be able to read the data that it is temporarily storing. After the second device 108 sends the data back to the first device 106, the first device 106 may be able to decrypt the data.

Alternatively, a mount may be used to facilitate secure transfer between the requesting device and the assisting device, such as an InterPlanetary File System (IPFS) mount, Network File System (NFS) mount, Network Basic Input/Output System (NetBIOS), FileShare, etc. The mount may be temporary or remote. The data may be secured with a key encryption. After the triggering event is no longer present (e.g., after the requesting device re-establishes communication with cloud storage), then the requesting device may cause or facilitate upload of the remote mount.

The following are specific examples of dynamic storage and forwarding of data of the system 100 of FIG. 1. Although specific examples are described, other situations are appreciated with respect to the descriptions provided herein.

In an example, a first device 106 (the requesting device) is unable to reach a cloud storage 122 (e.g., a triggering event). In response to the first device 106 being unable to reach the cloud storage 122, the first device 106 broadcasts an advertisement on the LAN 102, requesting temporary storage. At least a second device 108 (the assisting device) responds to the request with temporary storage terms, including a specified storage time (e.g., 8 hours) and a specified storage space (e.g., 5 GB). The first device accepts the temporary storage terms of the second device 108, encrypts its collected data and periodically sends or streams the encrypted data to the second device 108 up to the specified storage space during the specified storage time. Before nearing the specified storage time or specified storage space, the first device 106 re-establishes a connection with the cloud storage 122. The first device 106 requests return of the data from the second device 108 to upload to the cloud storage 122. After transferring the data to the first device 106, which may be in pieces, the second device 108 deletes the data.

In another example, a first device 106 (the requesting device) is unable to reach a cloud storage 122 (e.g., a triggering event). In response to the first device 106 being unable to reach the cloud storage 122, the first device 106 broadcasts an advertisement on the LAN 102, requesting temporary storage. At least a second device 108 (the assisting device) responds to the request with temporary storage terms, including a specified storage time (e.g., 8 hours) and a specified storage space (e.g., 5 GB). The first device accepts the temporary storage terms of the second device 108, encrypts its collected data and periodically sends or streams the encrypted data to the second device 108 up to the specified storage space during the specified storage time. As the elapsed time approaches the specified storage time (e.g., at 7.5 hours), the first device 106 requests additional storage time from the second device 108. The second device 108 negotiates an additional specified storage time (e.g., an additional 4 hours, to total 12 hours). As the elapsed time approaches the additional specified storage time (e.g., at 11.5 hours), the first device 106 again requests additional storage time from the second device 108. The second device 108 declines to further extend the temporary storage term. The first device 106 then broadcasts an advertisement on the LAN 102. At least a third device 110 responds to the request with temporary storage terms, which could be the same or different than the temporary storage terms provided by the second device 108. The first device 106 accepts the temporary storage terms of the third device 110. The first device 106 then instructs the second device 108 to send the encrypted data to the third device 110. After sending the data to the third device 110 or upon expiration of the specified storage time, the second device 108 deletes the data. The first device 106 re-establishes a connection with the cloud storage 122 (e.g., release of the triggering event) and requests return of the data from the third device 110 to upload to the cloud storage 122. After transferring the data to the first device 106, the third device 110 deletes the data.

In another example, a first device 106 (the assisting device) is unable to connect to the Internet (e.g., a triggering event). In response to the first device 106 being unable to connect to the Internet, the first device 106 broadcasts an advertisement on the LAN 102, offering temporary storage terms, including a specified storage time (e.g., 8 hours) and a specified storage space (e.g., 5 GB). A second device 108 (the requesting device) accepts the temporary storage terms, encrypts its collected data and periodically sends or streams the encrypted data to the first device 106. The first device 106 detects reconnection to the Internet and begins returning the data to the second device 108. The second device 108 uploads the data to cloud storage 122. After transferring the data to the second device 106, the first device 106 deletes the data.

In another example, a first device 106 (the requesting device) is unable to reach a cloud storage 122 (e.g., a triggering event). In response to the first device 106 being unable to reach the cloud storage 122, the first device 106 broadcasts an advertisement on the LAN 102, requesting temporary storage. At least a second device 108 (the assisting device) responds to the request with temporary storage terms, including a specified storage time (e.g., 8 hours) and a specified storage space (e.g., 5 GB). The first device accepts the temporary storage terms of the second device 108, encrypts its collected data and periodically sends or streams the encrypted data to the second device 108 up to the specified storage space during the specified storage time. Before nearing the specified storage time or specified storage space, the first device 106 re-establishes a connection with the cloud storage 122. The first device 106 instructs the second device 108 to upload the data to the cloud storage 122. The second device 108 uploads the data to the cloud storage 122 and deletes the data.

In another example, a first device 106 (the requesting device) is unable to reach a cloud storage 122 (e.g., a triggering event). In response to the first device 106 being unable to reach the cloud storage 122, the first device 106 broadcasts an advertisement on the LAN 102, requesting temporary storage. A second device 108 (an assisting device) and a third device 110 (an assisting device) respond to the request with different temporary storage terms. The first device accepts the temporary storage terms of both the second device 108 and the third device 110. The first device 106, encrypts its collected data and periodically sends or streams some of the encrypted data to the second device 108 and some of the encrypted data to the third device 110. The first device 106 re-establishes a connection with the cloud storage 122. The first device 106 requests return of the data from the second device 108 and the third device 110, either concurrently or consecutively. The first device 106 uploads the data to the cloud storage 122. After transferring the data to the first device 106, which may be in pieces, the second device 108 and the third device 110 delete the data.

Figure 2:
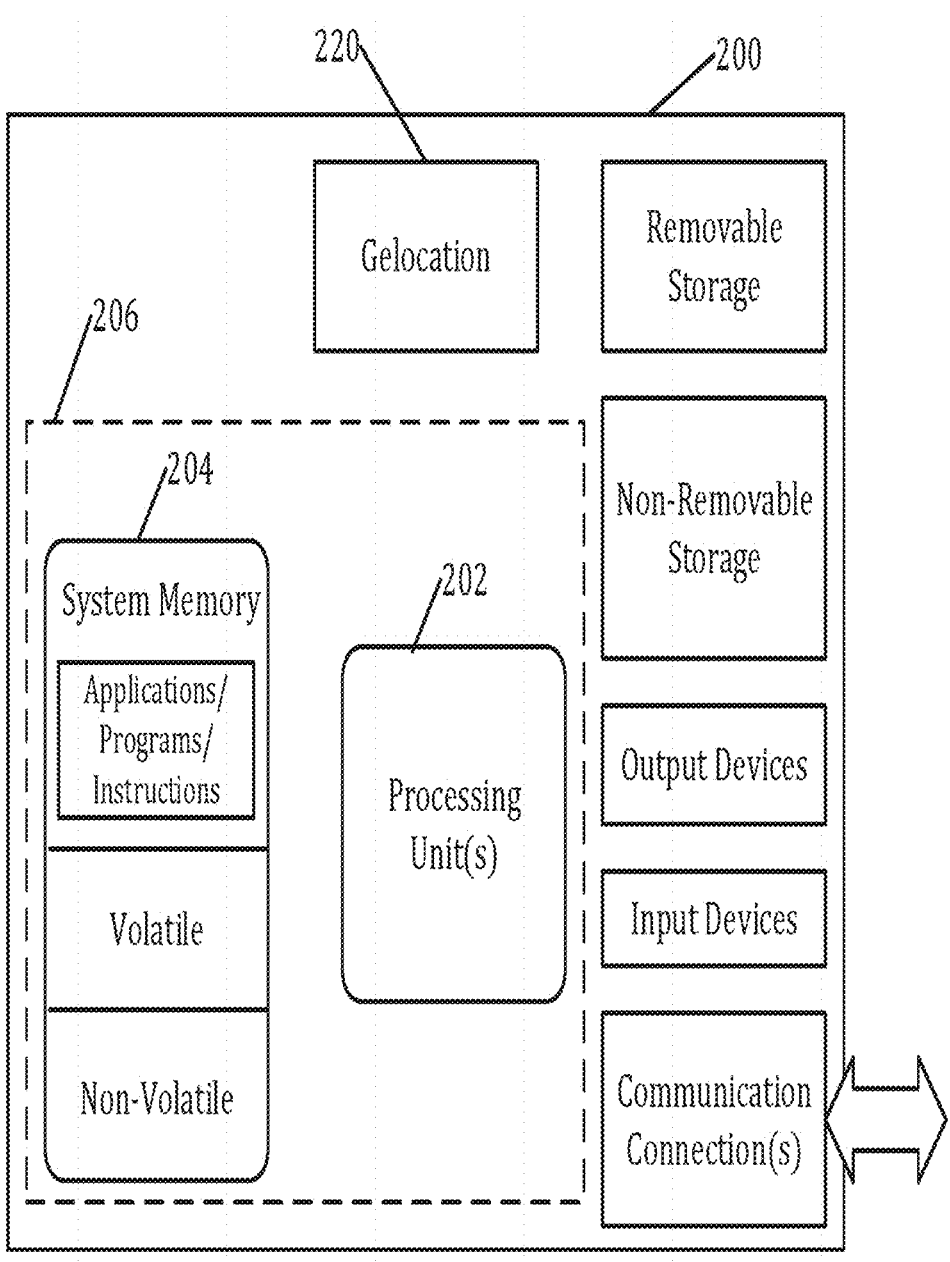
FIG. 2 depicts an example operating environment.

FIG. 2 depicts an example operating environment 200 that may be implemented by a client device, a dynamic storage and forwarding of data system or server, and/or other computing devices within the systems discussed herein. In its most basic configuration, operating environment 200 typically includes at least one processing unit 202 and memory 204. The processing unit may be a processor, which is hardware. Depending on the exact configuration and type of computing device, memory 204 (storing, instructions to perform the motion detection techniques disclosed herein) may be volatile (such as RAM), non-volatile (such as ROM, flash memory, etc.), or some combination of the two. This most basic configuration is illustrated in FIG. 2 by dashed line 206. The memory 204 stores instructions that, when executed by the processing unit(s) 202, perform the processes and operations described herein. Further, environment 200 may also include storage devices (removable 208, and/or non-removable 210) including, but not limited to, solid-state, magnetic disks, optical disks, or tape. Similarly, environment 200 may also have input device(s) 214 such as keyboard, mouse, pen, voice input, etc. and/or output device (s) 216 such as a display, speakers, printer, etc. Additional communication connections 212 may also be included that allow for further communication with LAN, WAN, point-to-point, etc. Operating environment 200 may also include geolocation devices 220, such as a global positioning system (GPS) device.

Operating environment 200 typically includes at least some form of computer readable media. Computer readable media can be any available media that can be accessed by processing unit 202 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

Figure 3:
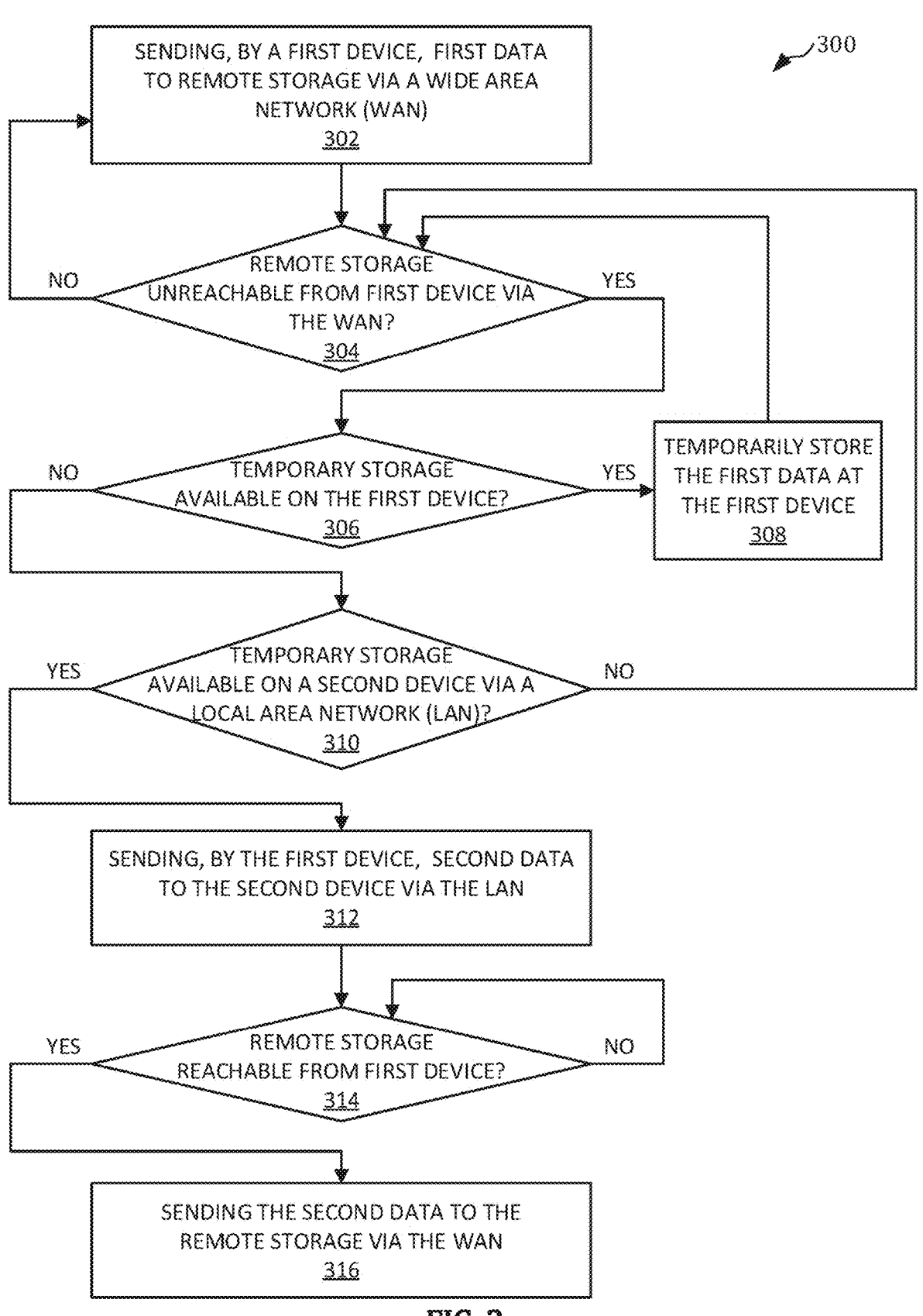
FIG. 3 depicts an example method for dynamic storage and forwarding of data.

FIG. 3 depicts a method 300 for dynamic storage and forwarding of data. At operation 302, first data is sent by a first device (e.g., devices 106-118 in FIG. 1) to remote storage (e.g., cloud storage 122, 124 in FIG. 1) via a wide area network (WAN). The first device may periodically send data to the remote storage for storage at the remote device. This may be, in part, due to limited internal storage space of the first device.

At determination 304, it is determined whether the remote storage is unreachable from the first device via the WAN. The remote storage may be unreachable via the WAN for a variety of reasons, including Internet outage, cloud outage, DNS failure, router outage, etc. Reachability of the remote storage may be determined by the first device, e.g., based on an acknowledgement of a storage-access attempt by the first device, by a ping/response protocol, or otherwise. For example, in the absence of acknowledgement from the remote storage, or no response from the remote storage after a specified period of time, the first device may determine that the remote storage is unreachable. If the first device determines that the remote storage is still reachable, the method 300 flows "NO" back to operation 302 where data is sent to the remote storage from the first device.

If, alternatively, the first device determines that the remote storage is unreachable (which may, itself, be a triggering event), the method 300 flows "YES" to determination 306. At determination 306, it is determined whether temporary storage is available on the first device. The temporary storage on the first device may be internal storage of the first device. Availability of the temporary storage may be based on a remaining storage capacity of the internal storage of the first device. For example, storage may not be available on the first device if at least a threshold percentage of total storage capacity (e.g., 80%, 90%, 95%, etc.) of the first device is used (which may be, by itself or in combination with reachability of the remote storage, a triggering event).

If it is determined that temporary storage is available on the first device, the method 300 flows "YES" to operation 308. At operation 308, the first data is temporarily stored at the first device. Operations 304-308 may repeat as required or desired. For example, the first device may continue to temporarily store the first data until the remote storage is reachable and/or until temporary storage is no longer available on the first device.

If, alternatively, it is determined that temporary storage is not available on the first device, the method 300 flows "NO" to determination 310. At determination 310, is it determined whether temporary storage is available on a second device (e.g., devices 106-118 in FIG. 1) via a local area network (LAN) (e.g., LAN 102 in FIG. 1). Temporary storage may be determined on a second device on the LAN based on a broadcasted advertisement via the LAN. As otherwise described herein, the broadcast may originate from the first device or the second device. For example, the first device may broadcast an advertisement requesting temporary storage on another device. In another example, the second device may broadcast an advertisement for available temporary storage. The broadcast may be based on a triggering event or may be periodic. In examples, the broadcast can also include direct messaging between devices on the LAN that are known to each other. A determination of temporary storage on the second device may be made based on if the second device responds to a request for temporary storage from the first device (e.g., a response indicating that the second device is available for temporary storage) and/or if the second device broadcasts an advertisement of availability. As otherwise described herein, the availability of temporary storage at the second device may have specified terms, including specifying an amount of data that the second device is capable of storing for the first device and a duration that the second device will temporarily store the data. The broadcasted advertisement may be sent to multiple devices via the LAN. For example, a broadcasted advertisement requesting temporary storage from the first device may be sent to the second device as well as a third device and/or fourth device and/or fifth device, etc.

If it is determined that there is no temporary storage space available on a second device via the LAN, the method flows "NO" back to determination 304. Operations 304-310 may repeat as required or desired. For example, the first device may continue to determine temporary storage availability on the second device until the remote storage is reachable and/or until temporary storage is available on the first device.

If, alternatively, it is determined that there is temporary storage space available on the second device, the method 300 flows "YES" to operation 312. At operation 312, second data is sent by the first device to the second device via the LAN. The second data may be representative of all of or a portion of the first data attempted to be sent to the remote storage at operations 302-304. For example, if a portion of the first data may be temporarily stored at the first device, then the remaining portion may be represented by the second data. The second data may be an encrypted version of all or a portion of the first data. The second data may be encrypted by the first device prior to sending to the second device. A storage key may also be sent to the second device with the second data.

At determination 314 it is determined if the remote storage is reachable from the first device. This may be similar to the determination made at determination 304. This determination 314 may be made periodically by the first device until it is determined that the remote storage is reachable. For example, if it is determined that the remote storage is unreachable, then method 300 flows "NO" and repeats determination 314 until a determination is made that the remote storage is reachable.

In addition to determining if the remote storage is reachable, the specified terms of the temporary storage may be monitored. For example, the first device and/or second device may determine if an amount of the second data sent to the second device is nearing the specified amount of data for the temporary storage (e.g., the specified storage space) and/or if an elapsed time or duration is nearing the specified duration (e.g., the specified storage time). The specified terms may be indicated by the second device, and received by the first device. For example, an indication of when the second data will expire at the second device may be sent to the first device. Prior to expiration of the second data at the second device, the first device may request that the second data be transferred by the second device. The transfer of data may be to the first device or to a different device (e.g., third device) via the LAN. A determination may be made by the first device that a third device connected to the first device via the LAN has capacity to store the second data. The first device may then request that the second data be transferred by the second device to the third device.

If, alternatively, it is determined that the remote storage is reachable from the first device, then the method 300 flows "YES" to operation 316. At operation 316, the second data is sent to the remote storage via the WAN. The second data may be sent to remote storage from the first device, second device, or third device. The first device may request return of the second data from the second device or the third device, or the first device may instruct the second device or the third device to send the second data to the remote storage. The request for the second data may include the storage key along with the second data. If the second data was encrypted, the first device may modify the second data prior to sending data to the remote storage.

Figure 4:
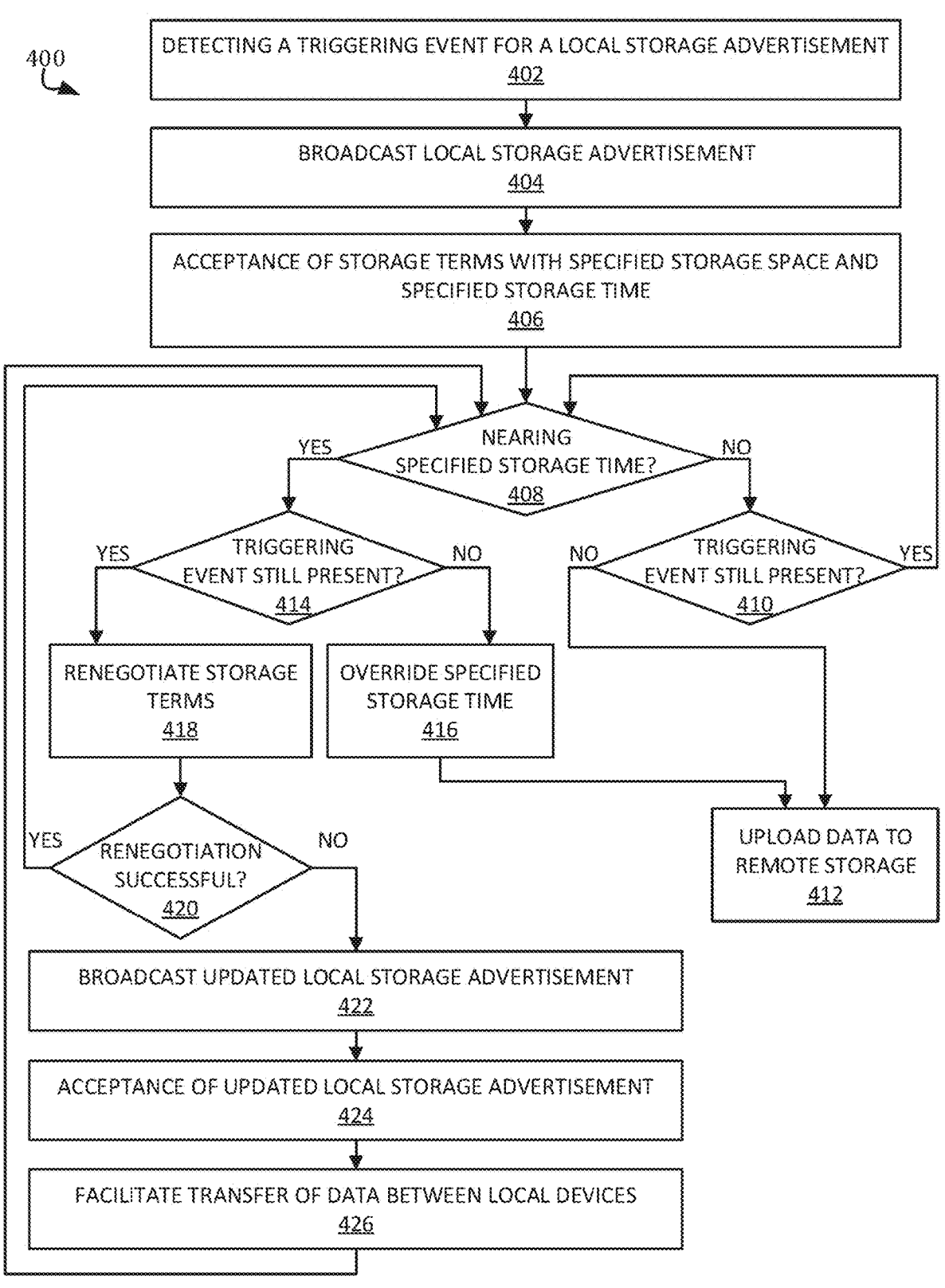
FIG. 4 depicts another example method for dynamic storage and forwarding of data.

FIG. 4 depicts another method 400 for dynamic storage and forwarding of data. At operation 402, a triggering event is detected for a local storage advertisement. The triggering event may be detected by a requesting device (e.g., a device on a LAN in need of temporary storage on another device) or detected by an assisting device (e.g., a device on the LAN that has available temporary storage). A triggering event detected by a requesting device may include determining that an internal storage of the device has reached a threshold capacity, determining that a remote storage is unreachable from the requesting device (e.g., via a WAN), and/or determining an Internet outage. A triggering event detected by an assisting device may include an indication of an Internet outage, a periodic time lapse (e.g., periodically advertising availability), and/or a received request from at least one other device on the LAN indicating a need for temporary storage.

At operation 404, a local storage advertisement is broadcasted. The broadcast may be sent by the requesting device or the assisting device via the LAN. Additionally, the broadcast may be sent in response to the triggering event described at operation 402. For example, a requesting device may broadcast a local storage advertisement requesting temporary storage on another LAN device. This advertisement may be in response to the requesting device determining that remote storage is unreachable. In another example, an assisting device may broadcast a local storage advertisement indicating available temporary storage either periodically or in response to determining an Internet outage.

At operation 406, storage terms with specified storage space and specified storage time are accepted. The storage terms may be dictated by the assisting device. For example, when the assisting device is broadcasting an advertisement, the storage terms may be specified with the advertisement. Alternatively, an assisting device may respond to an advertisement from a requesting device with the storage terms (e.g., the response from the assisting device to the requesting device includes storage terms specifying a storage space and a storage time). The storage terms may be negotiated between the requesting device and the assisting device. Acceptance of the storage terms may include sending of data from the requesting device to the assisting device. The data sent from the requesting device to the assisting device may be encrypted and may be accompanied by an identifying key (e.g., a hash of the data).

At determination 408, it is determined if an elapsed time is nearing the specified storage time. The elapsed time is the time duration that has passed since accepting the storage terms. As otherwise described herein, any data temporarily stored by an assisting device may be deleted at expiration of the specified storage time. Thus, as an elapsed time approaches the specified storage time, the temporary storage may be assessed for a time extension and/or transfer to another temporary storage location (e.g., on a different LAN device). A determination of the elapsed time nearing the specified storage time may be made by the requesting device or the assisting device. For example, the assisting device may determine that an elapsed time is within a time threshold of the storage time and send a notification to the requesting device of an impending expiration of the storage time. In another example, the requesting device may determine that an elapsed time is within a time threshold of the storage time and request additional time for storage of the data. A time threshold may be an elapsed percentage (e.g., 80%, 90%, 95%, 99%, etc.) of the specified storage time or a remaining amount of the specified storage time (e.g., 5 minutes, 15 minutes, 1 hour, etc.).

If it is determined that sufficient specified storage time remains (e.g., a time threshold has not yet been reached), the method 400 flows "NO" to determination 410. At determination 410, it is determined if the triggering event is still present. Determination of if the triggering event is still present may be made by the same device detecting the triggering event at operation 402. For example, if the triggering event was detected by the requesting device (e.g., based on a threshold capacity of the requesting device, reachability of remote storage, and/or Internet outage), the triggering event at determination 410 may be similarly determined by the requesting device. In another example, if the triggering event was detected by the assisting device (e.g., based on an Internet outage, a periodic time lapse, and/or advertisements from other LAN devices), the triggering event at determination 410 may be similarly determined by the assisting device. If it is determined that the triggering event is still present (e.g., still ongoing), then the method 400 flows "YES" back to determination 408. Determinations 408-410 may repeat as required or desired until either the elapsed time nears the specified storage time or until the triggering event is no longer present. If, alternatively, it is determined that the triggering event is no longer present, then the method 400 flows "NO" to operation 412.

At operation 412, data is uploaded to the remote storage. Data may be caused to sent to the remote storage, based on the absence of the triggering event. For example, data may be uploaded to the remote storage if the requesting device has a storage capacity below a threshold capacity, if the remote storage is reachable, and/or if the Internet is available. For instance, data may be caused to be sent to remote storage based on determining that the remote storage is reachable from the requesting device (e.g., via a WAN). In another example, data may be uploaded to the remote storage if the assisting device determines that Internet is available, after a time lapse, and/or in an absence of requesting advertisements from other devices. The data may be uploaded by the requesting device or the assisting device. If the data is uploaded by the requesting device, the requesting device may first cause the data to be returned from the assisting device. For example, the requesting device may send, via the LAN, a request for the second device to return the data, receive the data from the assisting device, and then send the data, via the WAN, to the remote storage. The request for the return of the data may be accompanied by a storage key. If the data is encrypted, the data may be modified by the requesting device prior to being sent to the remote storage. In an example where the assisting device uploads the data to the remote storage, the requesting device may send instructions to the assisting device to do so.

If, alternatively, it is determined that the elapsed time is nearing the specified storage time (e.g., that a time threshold has been reached or exceeded), then method 400 flows "YES" to determination 414. At determination 414, it is determined whether the triggering event is still present. This determination is similar to that described with respect to determination 410.

If it is determined that the triggering event is not present, then the method 400 flows "NO" to operation 416. In this situation, the data is ready to be uploaded to the remote storage, but there is a risk that the specified storage time may expire during the upload and/or transfer of the data. At operation 416, the specified storage time is overridden. The data is then uploaded to remote storage at operation 412. The override at operation 416 may prevent deletion of data to due expiration of the specified storage time during data transfer. A confirmation of the override may be sent from the assisting device and received by the requesting device. Data transfer may be slow depending on how much data can be transferred in a packet and how quickly packets are delivered and accepted (e.g., by the requesting device, if the requesting device is uploading the data, or by the remote storage, if the assisting device is uploading the data). As otherwise described herein, after the data is transferred, the data is deleted from the temporary storage.

If, alternatively, it is determined that the triggering event is still present, the method 400 flows "YES" to operation 418. At operation 418, storage terms are renegotiated. Renegotiation of storage terms may include renegotiating the specified storage space and/or the specified storage time. New storage terms may be proposed by either the requesting device or the assisting device. In an example, the requesting device may request an extension of the specified storage time at the assisting device. In another example, the assisting device may propose a new storage time and a new storage space.

At determination 420, it is determined if the renegotiation was successful (e.g., if new storage terms were proposed by one device and accepted by the other). An acceptance of new storage terms (e.g., a successful renegotiation) may be similar to that described with respect to operation 406. In an example, a confirmation or denial may be sent by one device and received by the other. For instance, a requesting device may request an extension of time for the temporary storage and the assisting device may deny the extension. If the storage terms are successfully renegotiated, the method 400 flows "YES" back to determination 408, to determine if the elapsed time is nearing the new specified storage time (e.g., if the elapsed time is nearing the renegotiated specified storage time). Operations 408-420 may repeat as required or desired until data is uploaded to remote storage or a renegotiation is not successful.

If, alternatively, the renegotiation is not successful, method 400 flows "NO" to operation 422. At operation 422, an updated local storage advertisement is broadcasted. This broadcast may be similar to the broadcast described at operation 404 for the requesting device. At operation 424, the updated local storage advertisement is accepted. This acceptance may be similar to the acceptance described at operation 406 for the requesting device. For example, the requesting device may broadcast, via the LAN, a new request for new temporary storage. The request may be accepted by a different assisting device (e.g., different from the original assisting device accepting the original temporary storage at operation 406) and may have different storage terms from the storage terms specified by the original assisting device.

At operation 426, transfer of data is facilitated between local devices. In an example, the data is transferred from the original assisting device (e.g., the assisting device of operation 406) to the new assisting device (e.g., the assisting device of operation 424). The transfer of data may be directly from the original assisting device to the new assisting device (e.g., as instructed by the requesting device). Alternatively, the transfer of data may flow from the original assisting device to the requesting device to the new assisting device. The data may be transferred in an encrypted state and may be accompanied by a storage key.

Operations 408-426 may repeat as required or desired. For example, the data may be passed between different devices on the LAN having different temporary storage and storage terms until the data may be uploaded to remote storage.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method comprising:

generating, by a first device, first data to be stored at remote storage via a wide area network (WAN);

determining that the remote storage is unreachable from the first device;

determining, in response to determining that the remote storage is unreachable from the first device, whether temporary storage is available on a second device via a local area network (LAN);

sending, by the first device, second data to the second device via the LAN;

determining that the remote storage is reachable from the first device via the WAN; and causing, based on determining that the remote storage is reachable from the first device via the WAN, the second data to be sent to the remote storage, wherein determining whether temporary storage is available on a second device via the LAN is also based on determining that storage capacity of the first device exceeds a threshold, and wherein determining whether temporary storage is available on the second device comprises:

sending, by the first device, a request for temporary storage comprising a broadcast advertisement that is sent to the second device and at least a third device via the LAN; and receiving, by the first device, a response from the second device indicating that the second device is available for temporary storage and comprising an amount of the second data that the second device is capable of storing for the first device and a duration that the second device will temporarily store the second data.

2. The method of claim 1, further comprising encrypting, by the first device, the second data prior to sending the second data to the second device, wherein the second data is a portion of the first data.

3. The method of claim 1, further comprising sending, by the first device, a storage key to the second device with second data.

4. The method of claim 3, wherein causing the second data to be sent to the remote storage comprises:

sending a request for the second data from the first device to the second device, the request for the second data comprising the storage key;

receiving, by the first device, the second data from the second device; and sending the second data from the first device to the remote storage.

5. The method of claim 1, wherein causing the second data to be sent to the remote storage comprises:

sending a request to the second device to send the second data from the second device to the remote storage.

6. A system comprising:

at least one processor; and memory, operatively connected to the at least one processor and storing instructions that, when executed by the at least one processor, cause the system to perform a method, the method comprising:

detecting, by a first device, that a remote storage is unreachable via a wide area network (WAN), wherein detecting that the remote storage is unreachable via the WAN is also based on determining that storage capacity of the remote storage exceeds a threshold;

broadcasting, by the first device via a local area network (LAN), a first request for first temporary storage that is sent to at least a second device and a third device;

receiving, by the first device, a response from the second device indicating that the second device is available for temporary storage and comprising first storage terms, an amount of data that the second device is capable of storing for the first device, and a duration that the second device will temporarily store the data;

accepting, by the first device, the first storage terms for the first temporary storage at the second device, the first storage terms including a first specified storage time;

sending, by the first device, the data to the second device;

determining, by the first device, that an elapsed time is nearing the first specified storage time;

requesting, by the first device, an extension of the first specified storage time at the second device;

receiving, at the first device, a denial of the extension from the second device;

broadcasting, by the first device via the LAN, a second request for second temporary storage;

accepting, by the first device, second storage terms at the third device, the second storage terms including a second specified storage time; and causing a transfer of the data from the second device to the third device.

7. The system of claim 6, wherein the method further comprises:

determining, by the first device, that the remote storage is reachable from the first device via the WAN;

receiving, based on determining that the remote storage is reachable from the first device via the WAN, the data to be sent to the first device from the third device; and sending the data to the remote storage from the first device.

8. The system of claim 6, wherein the data is encrypted by the first device.

* * * * *